A. R. DODGE.

FLOW METER.

APPLICATION FILED JAN. 29, 1917.

Reissued Mar. 13, 1917.

14,269.

Inventor:
Austin R. Dodge,
by Allen A. Dam
His Attorney.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

FLOW-METER.

14,269. Specification of Reissued Letters Patent. Reissued Mar. 13, 1917.

Original No. 1,209,567, dated December 19, 1916, Serial No. 65,245, filed December 6, 1915. Application for reissue filed January 29, 1917. Serial No. 145,318.

*To all whom it may concern:*

Be it known that I, AUSTIN R. DODGE, a citizen of the United States, residing at Schenectady, county of Schenectady, State of New York, have invented certain new and useful Improvements in Flow-Meters, of which the following is a specification.

The present invention relates to flow meters and like instruments and has for its object to provide an improved integrating mechanism in an instrument of this type. In the embodiment of my invention as illustrated and described in this application, the improvements are shown in connection with a flow meter, but it will be understood that they are not necessarily limited thereto.

For a consideration of what I believe to be novel and my invention, attention is directed to the accompanying description and the claims appended thereto.

Figure 1:
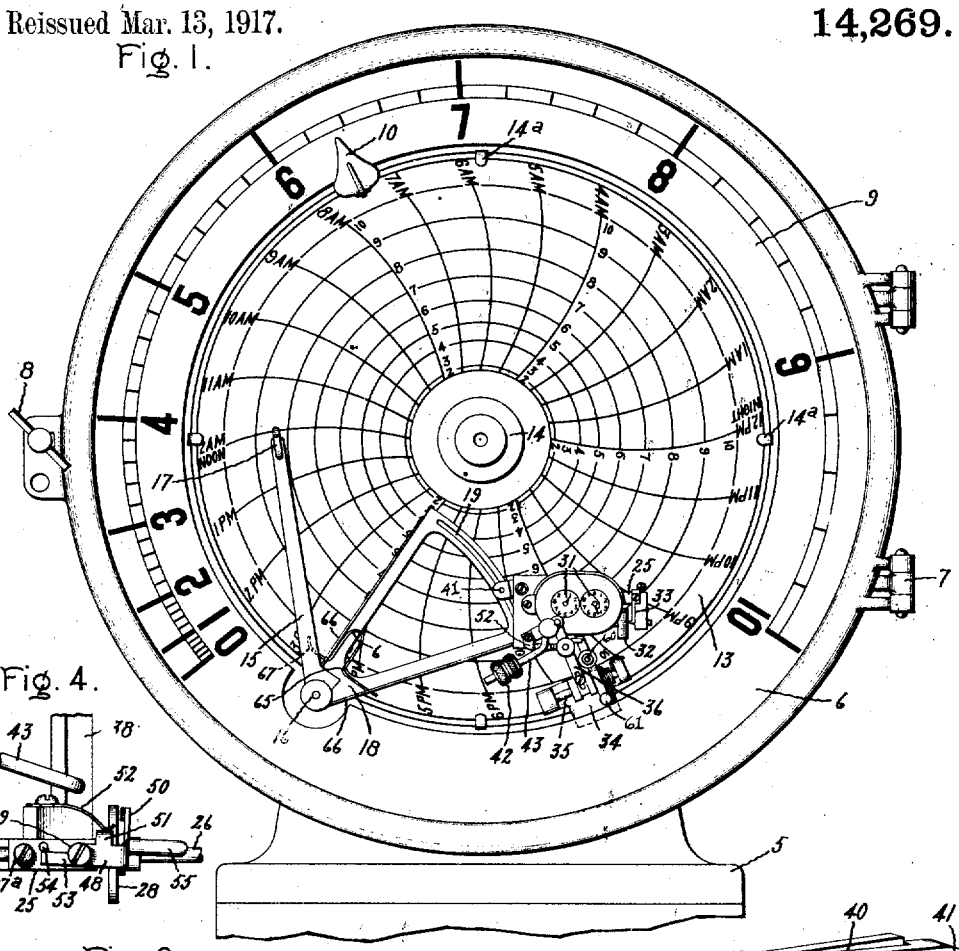
Figure 4:
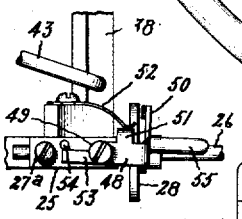
Figure 2:
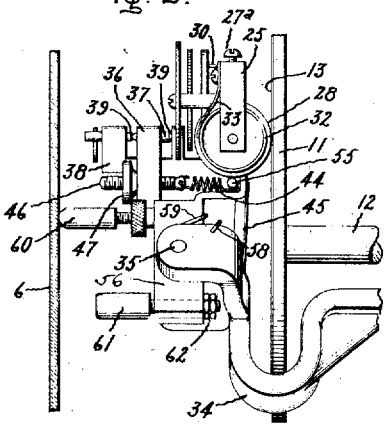
Figure 3:
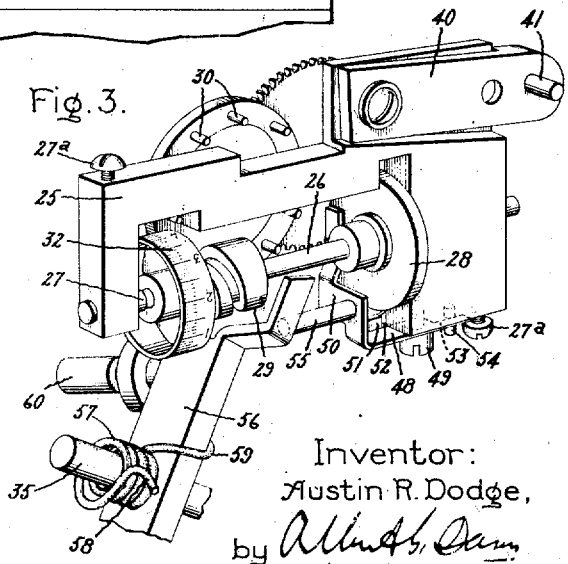

In the accompanying drawing, Figure 1 is a face view of a flow meter embodying my invention; Fig. 2 is a side elevation of the integrating mechanism and a portion of the meter casing and its cover; Fig. 3 is a perspective view looking at the integrating mechanism from the rear; and Fig. 4 is a detail view of certain of the parts.

Referring to the drawing, 5 indicates the casing and framework of a meter and 6 the cover which is glazed and is hinged to the casing at 7, and has a suitable fastening means 8 for fastening it closed. 9 is a scale which is visible through the glazed cover and 10 is a pointer coöperating therewith. 11 (Fig. 2) is a plate fixed in position by horizontal spaced standards carried by the framework of the meter. One of these standards is shown at 12 in Fig. 2. The plate 11 forms a backing for a chart 13 which is revolved by a suitable clockwork, it being fastened to a moving member of the clockwork by the nut 14 which engages it at its central portion. 14ª are clips fixed to the plate 11 and projecting over the edge of the chart to guide it in its movement. 15 is a flexible arm carried on the shaft 16 and having a pen 17 which engages the chart, the flexibility of the arm holding it there. On this same shaft is a member 18 having a cam slot 19 for turning the integrating mechanism, as will be explained more fully hereinafter. The parts so far described are not shown in greater detail as their specific structure forms no part of the present invention, and their general structure and mode of operation are well known to those familiar with this art. The internal mechanism of the meter may be, for example, of the same general structure as that disclosed in my Patent No. 1,118,403, dated November 24, 1914.

The integrating mechanism to which my improvements more particularly relate, comprises a frame 25 in which is pivoted a shaft 26. 27 indicates one of the pivot bearings for the shaft. The other pivot bearing, which may be of similar structure, does not show in the drawing, it being behind the measuring wheel 28 (Fig. 3), but its arrangement will be obvious. 27ª are screws for clamping bearings 27 in position in the frame 25. The measuring wheel 28 is fixed on shaft 26 and is adapted to bear against the chart 13 and be revolved thereby, thus revolving the shaft. On the shaft 26 is a spiral or worm gear wheel 29 which engages the pins 30 to drive the train of gearing that actuates the counters 31. Directly on the shaft 26 is also a counter wheel 32, and fixed on the frame 25 is a pointer 33 (Figs. 1 and 2) coöperating therewith. With this arrangement the counter wheel 32 indicates "units" and counters 31 indicate "tens" and "hundreds." This has the advantage that the "unit" reading is taken directly from the shaft movement and hence shows accurately the exact amount the shaft turns. The spiral or worm wheel 29 need, therefore, be accurate only to "tens" and not to "units" as would be the case were the "unit" wheel driven from it. Fixed to the framework of the meter is a bracket 34 in which is pivoted a shaft 35 carrying an arm 36 having on its free end a bearing pin 37. The frame 25 of the integrating mechanism has a projecting arm 38 with spaced bearings 39 thereon which engage bearing pin 37. These bearings are so located that the axis of rotation of the integrating mechanism on them coincides with the diameter of the wheel 28. When the integrating mechanism turns on its bearings 39 the wheel 28 will not be moved relative to the chart 13 but will only have its angular position relative to the chart changed. The frame 25 has fixed to it an arm 40 which carries a pin 41 engaging with cam slot 19. At no flow the pin 41 engages the cam slot at such a point that the plane of the measuring wheel 28 is radial. The movement of the chart will impart no movement to the wheel 28 when in this position. When the fluid is flowing the movement of member 18 causes the cam slot 19 to ride along the pin and turn the measuring wheel 28 to vary its angular relation to chart 13, thus causing the chart to impart a rotary movement to the wheel depending upon the angular position of the wheel, which rotary movement is in turn imparted to the registering mechanism. The integrating mechanism is balanced on its pivots 39 by the adjustable weight 42 carried on the arm 43, and it is biased toward the chart by the spring 44 which connects between arm 36 and a post 45 projecting from bracket 34. The connection to arm 36 includes a threaded bolt 46 which may be adjusted by turning the nut 47 so as to adjust the tension of spring 44.

When the chart 13 is to be changed, the door 6 is opened, the integrating attachment is swung away from the chart on the pivoted shaft 35, and the old chart is then removed and a new one fastened in place. A mechanism of this character is made as nearly frictionless as possible, the wheels turning very easily, and it has been found that there is liability, unless care is exercised, of accidentally moving the counting wheels when the chart is being changed. To overcome this I provide a locking means for locking the wheels of the integrating mechanism prior to the removal of it from the chart and for keeping them locked until it is again back on the chart. To this end I provide a locking member comprising a base 48 pivoted to the frame 25 by a screw 49, and an arm 50 which extends at an angle to the base and terminates adjacent the side of the wheel 28. The base portion has an ear or lug 51 against which bears a spring 52 for holding arm 50 out of engagement with the wheel 28, and also a finger 53 which engages a stop 54 for limiting its movement due to spring 52. The face of the arm 50 adjacent the wheel 28 is preferably provided with a facing of leather or other suitable material so as to obtain a good frictional engagement. Fixed to the locking member is a projecting pin 55 adapted to be engaged by an actuator 56 which is loosely supported on the shaft 35. When this actuator is moved in a direction away from the chart it engages pin 55 thereby turning the locking member on its pivot screw 49 so as to move arm 50 against the wheel 28 thus locking it; a further movement of the actuator then acts to move the integrating mechanism from the chart. This actuator 56 may be moved either manually or otherwise. In the present instance I have shown a preferred form wherein it is controlled jointly by the door of the casing and by a suitable spring. 57 indicates a spring coiled around shaft 35 with one end 58 fixed to bracket 34 and the other end 59 engaging the actuator. This spring tends to move the actuator in a direction to lock the integrating mechanism and move it from the chart. Carried by the actuator is an adjustable projection 60 which is adapted to be engaged by the inner face of the cover 6. The projection 60 is adjusted to such a length that when the cover is closed the actuator is pushed away from the pin 55 so that spring 44 holds the measuring wheel 28 against the chart. This is best shown in Fig. 2. 61 is an adjustable stop which engages with the side of bracket 34 to limit the outward movement of the actuator when the door is opened. It is so adjusted that, while it will permit of the actuator moving sufficiently far to raise the measuring wheel 28 from the chart, it will not permit of sufficient movement to raise the pin 41 out of cam slot 19. When the stop 61 is correctly adjusted it is locked by the lock nuts 62.

65 is a wire lifting member journaled in flanges 66 on member 18 and having a bent end 67 located under the pen arm 15. Its central portion 68 is formed as a loop to provide a handle for turning it so as to bring the end 67 into engagement with the pen arm to lift the pen from the chart; the pen arm 15 being flexible is simply bent out by it.

Fig. 2 shows the door closed and the parts in normal operative position. The inner face of the door bears against the end of projection 60 holding the actuator 56 away from pin 55. The spring 44 holds the measuring wheel 28 in engagement with the chart 13. If now it is desired to change the chart the door is opened. This releases the actuator and the spring 57 turns it on shaft 35 until stop 61 engages the bracket 34. This movement, as already explained, first turns the locking member on pivot screw 49 so that its arm 50 engages and locks the measuring wheel 28, and then lifts the wheel from the chart. In this connection it will be understood that the spring 57 is stronger than spring 44, which now serves to hold the brake 50 against wheel 28. The wire-lifting member 65 is also turned to lift the pen 17 from the chart. The nut 14 is then removed, the old chart slipped off, a new one put in its place, and the nut replaced. During all this time the integrating mechanism is locked so there is no danger of its being accidentally moved. The lifting member is now moved back to its normal position permitting the pen to again engage the chart. It is now merely necessary to close the door, which will engage projection 60, and force the actuator 56 back to the position as shown in Fig. 2. The spring 44 causes the integrating mechanism to follow the movement of the actuator 56, keeping the pin 55 in engagement therewith until the measuring wheel 28 engages the chart. The actuator then moves away from pin 55 and the small spring 52 moves the locking member out of engagement with the measuring wheel 28 and into engagement with stop 54. The integrating mechanism thus remains locked until the measuring wheel is back on the chart. Since the pin 41 on arm 40 does not move out of engagement with cam slot 19, the relative positions of the parts while the chart is being changed will not be disturbed and no care will be required to keep the pin in the cam slot.

While I have shown and described an embodiment of my invention wherein the integrating mechanism is first locked, then removed from the chart, then moved back into engagement with the chart, and lastly unlocked, and while this is the arrangement I now prefer, it will be understood that my invention is not limited to this specific sequence in the operation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with an indicating instrument having a rotating member, of an integrating mechanism having a measuring wheel adapted to engage the member and have motion imparted to it therefrom, said integrating mechanism being arranged so that it may be moved to bring the measuring wheel into and out of engagement with the rotating member, means for so moving the integrating mechanism, and means for locking the measuring wheel before it is moved from the rotating member.

2. The combination with an indicating instrument having a rotating member, of an integrating mechanism having a measuring wheel adapted to engage the member and have motion imparted to it therefrom, said integrating mechanism being arranged so that it may be moved to bring the measuring wheel into and out of engagement with the rotating member, means for so moving the integrating mechanism, and means for locking the measuring wheel before it is moved from the rotating member and maintaining it locked until it is moved back into engagement therewith.

3. The combination in an indicating instrument, of a rotating chart, a pivoted integrating mechanism having a measuring wheel which engages the chart, said mechanism being adapted to be turned on its pivot to bring the measuring wheel into and out of engagement with the chart, means for so turning it, and a locking member controlled by said means for locking the measuring wheel before it is moved from the chart and maintaining it locked until it is again moved back into engagement therewith.

4. The combination in an indicating instrument, of a rotating chart, a pivoted integrating mechanism having a measuring wheel which engages the chart, said mechanism being adapted to be turned on its pivot to bring the measuring wheel into and out of engagement with the chart, and means including a locking device for the integrating mechanism for so turning it.

5. The combination with an indicating instrument having a rotating chart, of a pivoted integrating mechanism having a measuring wheel which engages the chart, said mechanism being adapted to be turned on its pivot to bring the measuring wheel into and out of engagement with the chart, means for so turning it, and means for locking the integrating mechanism against movement when out of engagement with the chart.

6. The combination in an indicating instrument having a cover, of a rotating chart, a pivoted integrating mechanism having a measuring wheel which engages the chart, said mechanism being adapted to be turned on its pivot to bring the measuring wheel into and out of engagement with the chart, and means controlled by the closing and opening of the cover for so turning it.

7. The combination with an indicating instrument having a cover and a rotating chart, of a pivoted integrating mechanism having a measuring wheel which engages the chart, said mechanism being adapted to be turned on its pivot to bring the measuring wheel into and out of engagement with the chart, and means controlled by the closing and opening of the cover for so turning it and for locking the measuring wheel against movement while it is out of engagement with the chart.

8. The combination with an indicating instrument having a cover and a rotating chart, of a pivoted integrating mechanism having a measuring wheel which engages the chart, said mechanism being adapted to be turned on its pivot to bring the measuring wheel into and out of engagement with the chart, means for so turning it, and a locking device controlled by the door for locking said integrating mechanism against movement before it is moved from the chart and maintaining it locked while out of engagement with the chart.

9. The combination with an indicating instrument having a cover, of a rotating chart, a pivoted integrating mechanism having a measuring wheel which engages the chart, said mechanism being adapted to be turned on its pivot to bring the measuring wheel into and out of engagement with the chart, and means controlled by the closing and opening of the door for so turning it and for locking the integrating mechanism against accidental movement.

10. The combination with an indicating instrument having a rotating chart, of an integrating mechanism supported adjacent thereto and having a measuring wheel which engages the chart, said mechanism being adapted to be moved on its support to bring the measuring wheel out of and into engagement with the chart, a locking member for engaging the measuring wheel and locking it against movement, and an actuator for moving the measuring wheel out of engagement with the chart and bringing the locking member and measuring wheel into engagement with each other.

11. The combination with an indicating instrument having a cover and a rotating chart, of an integrating mechanism supported adjacent thereto and having a measuring wheel which engages the chart, said mechanism being adapted to be moved on its support to bring the measuring wheel out of and into engagement with the chart, a locking member for engaging the measuring wheel and locking it against movement, and an actuator controlled by the cover for moving the measuring wheel out of engagement with the chart and bringing the locking member and measuring wheel into engagement with each other.

12. The combination with an indicating instrument having a cover and a rotating chart, of an integrating mechanism supported adjacent thereto and having a measuring wheel which engages the chart, said mechanism being adapted to be moved on its support to bring the measuring wheel out of and into engagement with the chart, a locking member for engaging the measuring wheel and locking it against movement, said locking member being normally biased to a position out of engagement with the wheel, an actuator for engaging the locking member to move it into engagement therewith, a spring which biases it to such position, and a projection carried by the actuator which is engaged by the cover to hold the actuator out of engagement with the locking member.

13. In a flow meter, the combination of a member having a cam slot which is moved in accordance with the flow, a rotating chart, an integrating mechanism having a measuring wheel which engages the chart, said mechanism being pivoted adjacent the chart to turn on an axis perpendicular thereto and also on an axis parallel to it, a pin carried by the mechanism and engaging with the cam slot for turning the mechanism on its perpendicular axis, an actuator for turning it on its parallel axis, and means for limiting the turning action on the parallel axis so that said pin will not be removed from the cam slot.

14. In a flow meter, the combination of a member having a cam slot which is moved in accordance with the flow, a rotating chart, an integrating mechanism having a measuring wheel which engages the chart, said mechanism being pivoted adjacent the chart to turn on an axis perpendicular thereto and also on an axis parallel to it, a pin carried by the mechanism and engaging with the cam slot for turning the mechanism on its perpendicular axis, an actuator for turning it on its parallel axis, means controlled by the actuator for locking the measuring wheel, and means for limiting the turning action on the parallel shaft so that said pin will not be removed from the cam slot.

15. The combination with an indicating instrument having a rotating member, of an integrating mechanism having a measuring wheel adapted to engage the member and have motion imparted to it therefrom, said integrating mechanism being arranged so that it may be moved to bring the measuring wheel into and out of engagement with the rotating member, a locking means for the measuring wheel, and means for operating said locking means so that the measuring wheel may be locked before it is removed from the rotating member and kept in locked position until it is moved back into engagement therewith.

16. The combination with an indicating instrument having a rotating member, of an integrating mechanism having a measuring wheel adapted to engage the member and have motion imparted to it therefrom, said integrating mechanism being arranged so that it may be moved to bring the measuring wheel into and out of engagement with the rotating member, means for so moving the integrating mechanism, a locking means biased to a position where it locks the integrating wheel, and means for holding it out of engagement therewith when the integrating mechanism is in engagement with the rotating member.

17. The combination of an indicating instrument having a cover, a rotating member, a pivoted integrating mechanism having a measuring wheel which engages the member, said mechanism being adapted to be turned on its pivot to bring the measuring wheel into and out of engagement with the rotating member, a locking device biased to a position where it locks the measuring wheel, and means carried by it which is engaged by the door when closed for holding the locking mechanism out of locking position.

In witness whereof, I have hereunto set my hand this 4th day of December, 1915.

AUSTIN R. DODGE.